US009507860B1

(12) United States Patent
Oztaskent et al.

(10) Patent No.: US 9,507,860 B1
(45) Date of Patent: Nov. 29, 2016

(54) SYSTEMS, METHODS, AND MEDIA FOR IDENTIFYING CONTENT

(71) Applicant: Google Inc., Mountain View, CA (US)

(72) Inventors: Ant Oztaskent, Greenwich (GB);
Yaroslav Volovich, Cambridge (GB);
Joanna Chwastowska, Tarnow (PL)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/827,249

(22) Filed: Mar. 14, 2013

(51) Int. Cl.
*G06F 17/30* (2006.01)
*G06F 7/00* (2006.01)

(52) U.S. Cl.
CPC ... *G06F 17/30746* (2013.01); *G06F 17/30864* (2013.01)

(58) Field of Classification Search
CPC ................ G06F 17/30864; G06F 17/30867; G06F 17/30286; G06F 17/30595; G06Q 30/02
USPC .......................................................... 707/769
See application file for complete search history.

(56) References Cited

U.S. PATENT DOCUMENTS

| 6,608,930 B1 | 8/2003 | Agnihotri et al. |
| 7,191,193 B2 | 3/2007 | Ben-Yaacov et al. |
| 7,599,554 B2 | 10/2009 | Agnihotri et al. |
| 2011/0078729 A1* | 3/2011 | Lajoie .................... G11B 27/28 725/36 |
| 2012/0239175 A1* | 9/2012 | Mohajer ........... G06F 17/30743 700/94 |
| 2013/0282747 A1* | 10/2013 | Cheng ............... G06F 17/30023 707/758 |
| 2014/0059065 A1* | 2/2014 | Cortes et al. ................. 707/758 |

FOREIGN PATENT DOCUMENTS

WO    WO/2012/057724    3/2012

OTHER PUBLICATIONS

Chattopadhyay, T. et al., "TV Video Context Extraction", In Proceedings of the 2011 IEEE Region 10 Conference (TENCON '11), Bali, IN, Nov. 21-24, 2011, pp. 216-220.
Wang, A., "An Industrial Strength Audio Search Algorithm", In Proceedings of the 4th International Conference on Music Information Retrieval (ISMIR '03), Baltimore, MD, US, Oct. 26-30, 2003, pp. 1.

* cited by examiner

*Primary Examiner* — Usmaan Saeed
*Assistant Examiner* — Raquel Perez-Arroyo
(74) *Attorney, Agent, or Firm* — Byrne Poh LLP

(57) ABSTRACT

Systems, methods, and media for identifying content are provided. In some implementations, systems for identifying content are provided, the systems comprising: at least one hardware processor that: receives content having audio; generates a representation of the audio of the content; performs a first database search based on the representation; performs a second database search based on text corresponding to words that are sung or spoken in the content; responsive to determining that the first database search yielded a match and the second database search yielded a match, causes a first indication that the content contains a known performance of known content to be output; and responsive to determining that the first database search failed to yield a match and the second database search yielded a match, causes a second indication that the content contains an unknown performance of known content to be output.

24 Claims, 6 Drawing Sheets

SYSTEMS, METHODS, AND MEDIA FOR IDENTIFYING CONTENT

TECHNICAL FIELD

The disclosed subject matter relates to systems, methods, and media for identifying content.

BACKGROUND

Entertainment programs involving musical segments have seen a significant increase in popularity in recent years. For example, talent shows, dancing shows, and benefit concerts have become very popular. As viewers watch such programs, they are exposed to music with which they may not have been previously familiar. When a viewer is interested in a particular piece of music, the viewer may find it difficult to determine the name of the piece of music when it is not provided by the entertainment program.

Viewers may employ music identification services to find the names of songs that are presented on such programs. Specifically, when a television viewer hears a song that he or she likes, the viewer may record a portion of the song's audio by using a microphone that is part of his or her mobile phone and transmit the recording to a remote server. The remote server may generate a fingerprint for the recorded audio and compare the fingerprint against a database of fingerprints. If the fingerprint of the recording matches a fingerprint in the database, the remote server may provide the user with the name of the song.

However, if the viewer were to hear a cover version of a song that is performed live on such a program, that viewer may not be able to identify the song using the above approach. Any fingerprint that is generated for the live performance of the song may not match fingerprints for past performances of the same song because the live, cover performance may sound differently from the past performances. For example, because many audio fingerprinting techniques rely on audio recordings' precise acoustic characteristics, subtle differences in sound between different versions of the same song may cause fingerprints for the different versions to not match one another.

Accordingly, the need exists for new systems, methods, and media for identifying content.

SUMMARY

Systems, methods, and media for identifying content are provided. In some implementations, systems for identifying content are provided, the systems comprising: at least one hardware processor that: receives content having audio; generates a representation of the audio of the content; performs a first database search based on the representation; performs a second database search based on text corresponding to words that are sung or spoken in the content; responsive to determining that the first database search yielded a match and the second database search yielded a match, causes a first indication that the content contains a known performance of known content to be output; and responsive to determining that the first database search failed to yield a match and the second database search yielded a match, causes a second indication that the content contains an unknown performance of known content to be output.

In some implementations, methods for identifying content are provided, the methods comprising: receiving content having audio; generating a representation of the audio of the content; performing a first database search based on the representation; performing a second database search based on text corresponding to words that are sung or spoken in the content; responsive to determining that the first database search yielded a match and the second database search yielded a match, causing, by at least one hardware processor, a first indication that the content contains a known performance of known content to be output; and responsive to determining that the first database search failed to yield a match and the second database search yielded a match, causing, by the at least one hardware processor, a second indication that the content contains an unknown performance of known content to be output.

In some implementations, non-transitory computer-readable media containing computer-executable instructions that, when executed by a processor, cause the processor to perform a method for identifying content are provided, the method comprising: receiving content having audio; generating a representation of the audio of the content; performing a first database search based on the representation; performing a second database search based on text corresponding to words that are sung or spoken in the content; responsive to determining that the first database search yielded a match and the second database search yielded a match, causing a first indication that the content contains a known performance of known content to be output; and responsive to determining that the first database search failed to yield a match and the second database search yielded a match, causing a second indication that the content contains an unknown performance of known content to be output.

In some implementations, systems for identifying content are provided, the systems comprising: means for receiving content having audio; means for generating a representation of the audio of the content; means for performing a first database search based on the representation; means for performing a second database search based on text corresponding to words that are sung or spoken in the content; responsive to determining that the first database search yielded a match and the second database search yielded a match, means for causing a first indication that the content contains a known performance of known content to be output; and responsive to determining that the first database search failed to yield a match and the second database search yielded a match, means for causing a second indication that the content contains an unknown performance of known content to be output.

In some implementations of these systems, the representation is a fingerprint.

In some implementations of these systems, the text is based on close captioning data that is associated with the content.

In some implementations of these systems, the text is based on optical character recognition performed on video that is part of the content.

In some implementations of these systems, the text is based speech recognition performed on the audio.

In some implementations of these systems, the means for causing the second indication to be output: transmits the second indication over a communications network to a client device; and/or displays the second indication on a display screen.

In some implementations of these systems, the means for causing the second indication to be output superimposes the second indication on video that is part of the content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In some implementations, mechanisms (which may include methods, systems, and media) for identification of content are provided. The mechanisms may receive a presentation of content (e.g., such as a television program) and text (e.g., such as captioning content) that is associated with the content. The mechanisms may then generate a representation (e.g., a fingerprint) for audio that is part of the content and compare the representation against a database of representations (e.g., fingerprints) for a plurality of pieces of content (e.g., songs). The mechanisms may then compare a block of the text (e.g., captioning content) against a database of text (e.g., lyrics) of the plurality of pieces of content (e.g., songs). When the comparison with the database of representations fails to yield a match and the comparison with the database of text yields a match, the mechanisms may determine that an unknown performance of known content is being presented.

In some implementations, the mechanisms may be useful in interactive advertising. For example, the mechanisms may be used to recognize a piece of content that is being presented and present a user with an offer for sale of a copy of the content.

Figure 1:
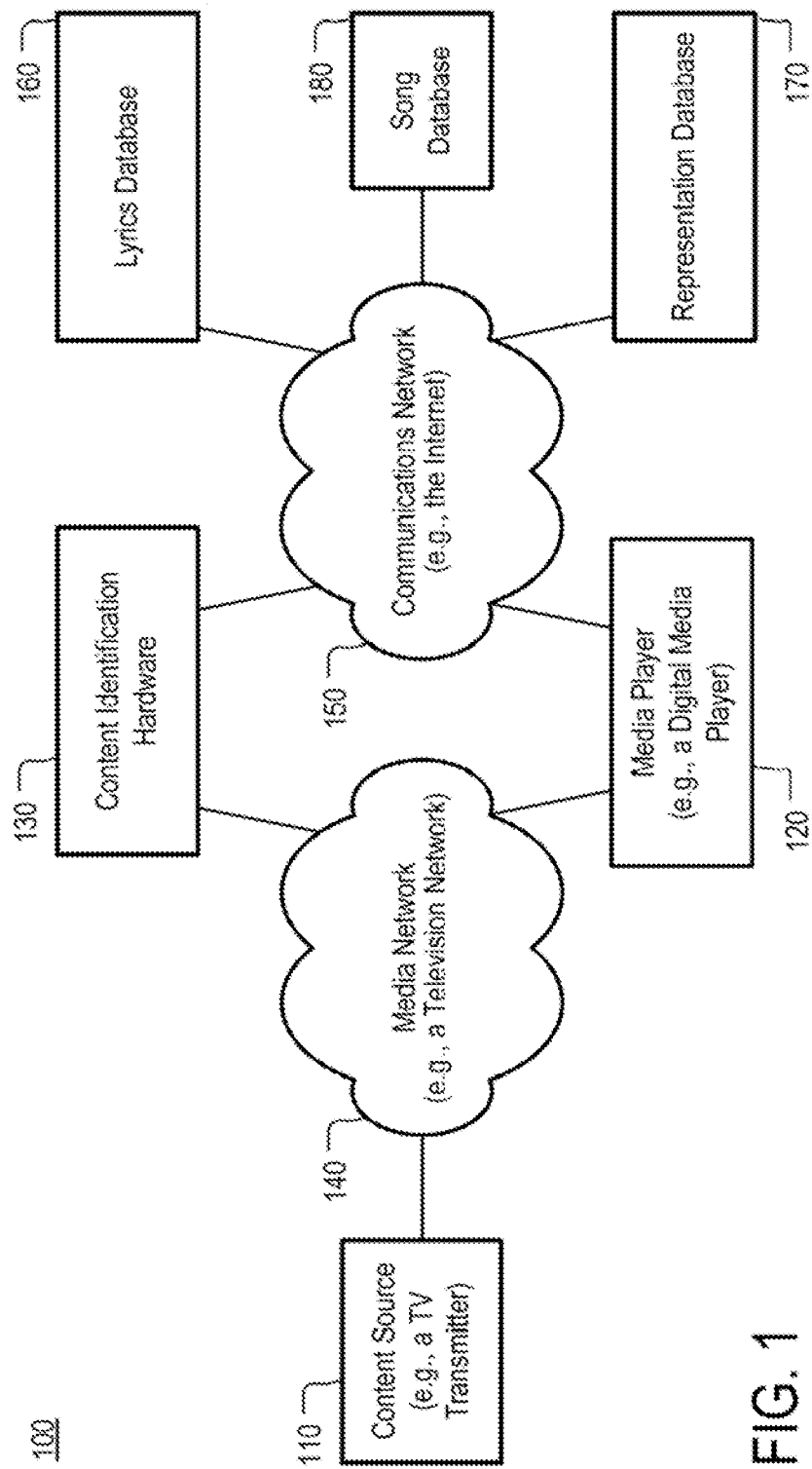
FIG. 1 is an example of a system for identification of content in accordance with some implementations of the disclosed subject matter.

FIG. 1 depicts an example of a system 100 for identification of content in accordance with some implementations of the disclosed subject matter. System 100 may include a content source 110, a media player 120, content identification hardware 130, a media network 140, a communications network 150, a lyrics database 160, a representation database 170, and a song database 180, and/or any other suitable components.

In some implementations, content source 110 may contain content and it may include any suitable equipment for the distribution of the content over any suitable mechanism such as the Internet, a wide area network, a local area network, a mobile phone network, a mobile data network, an over-the-air television network, an over-the-air radio network, a cable television network, a fiber optic network, an IPN network, a digital television network, a satellite network, an IPTV network, a broadcast television network, etc. The content may include video recordings, audio recordings, live video, and/or live audio. More particularly, for example, the content can include recorded or live television broadcasts, Internet streaming media, a media download, media delivered from a local or remote storage device, video-on-demand media, television programs, movies, news programs, plays, concerts, spoken word (e.g., poetry), songs, audio books, speeches, documentaries, and/or any other suitable content. By way of example, content source 110 can include a transmitter that is configured to transmit television signals or a server for streaming movies over the Internet.

Media player 120 may be any suitable equipment for receiving media content that is transmitted by content source 110. Media player 120 may include: a television; a monitor; a set-top box; a streaming media player; a media center computer; a home theater receiver; a DVD player; a Blu-ray player; a radio receiver; a satellite television receiver; a satellite radio receiver; a portable media player; a personal computer; a tablet, a laptop; a mobile phone; or any other suitable device.

Content identification hardware 130 may include hardware and or software for identifying content that is broadcast by content source 110. The structure and operation of content identification hardware 130 is further discussed with respect to FIGS. 2-5.

Media network 140 may include the Internet, a wide area network, a local area network, a mobile phone network, a mobile data network, an over-the-air television network, an over-the-air radio network, a cable television network, a fiber optic network, an IPN network, a digital television network, a satellite network, an IPTV network, a broadcast television network, or any other type of network that is suitable to carry content transmitted by content source 110 to media player 120 and content identification hardware 130. Media network 140 may use any suitable type of transmission medium, such as fiber optic cable; copper wire; or electromagnetic waves. For example, media network 140 may be an over-the-air television network.

Communications network 150 may include the Internet, a wide area network, a local area network, a mobile phone network, a mobile data network, an over-the-air television network, an over-the-air radio network, a cable television network, a fiber optic network, an IPN network, a digital television network, a satellite network, an IPTV network, a broadcast television network, or any other type of network that is suitable to carry data between content identification hardware 130, media player 120, lyrics database 160, fingerprint database 170, and song database 180.

In some implementations, media network 140 and communication network 150 can be coupled, integrated, and/or the same network.

Lyrics database 160 may include hardware and/or software for storing a plurality of information entries. In some implementations, each entry may include lyrics for a song, an identifier for the respective song (e.g., the song's title), and/or any other suitable information and/or data. In some implementations, using these entries, lyrics database 160 may be used to determine a song's identifier (e.g., a title) based on that song's lyrics.

Lyrics database 160 may be searchable. For example, lyrics database 160 may be configured to receive a search query that includes a block of text. The block of text may be encoded as a bitmap image, in ASCII, or in any other suitable format. Upon receiving the query, lyrics database 160 may compare the block of text to lyrics that are found in different entries in the database. If an entry is found that includes lyrics that match the text block (e.g., lyrics that are either the same or otherwise satisfy one or more predetermined similarity criterion with respect to the text block), lyrics database 160 may return a song identifier that is associated with the entry. Moreover, if an entry that includes lyrics that match the text block is found, the search may be considered to have yielded a match. Otherwise, if no such entry is found, the search may be considered to have failed to yield a match.

Representation database 170 may include hardware and/or software for storing a plurality of information entries. In some implementations, each entry may include a representation (e.g., a signature, a fingerprint, or any other suitable identifier) for a song, an identifier for the respective song (e.g., the song's title), and/or any other suitable information and/or data. A song's representation may be a unique or substantially unique representation of the song that is generated from at least a portion of audio of the song. For example, in some implementations, a representation may be a fingerprint of a song. Any suitable fingerprinting technique may be used to generate such a fingerprint, in some implementations. For example, a hashing technique may be used to generate a fingerprint in some implementations.

Representation database 170 may be searchable. For example, representation database 170 may be configured to receive a search query that includes a fingerprint for at least a portion of a content item. Upon receiving the query, representation database 170 may compare the fingerprint included in the query to fingerprints that are found in different entries in the database. Moreover, if an entry is found that includes a fingerprint that matches the fingerprint from the query (e.g., the fingerprint is either the same or otherwise satisfies a predetermined similarity criterion with respect to the fingerprint from the search query), representation database 170 may return a song identifier that is associated with the entry. Moreover, if an entry that includes a fingerprint that matches the fingerprint included in the query is found, the search may be considered to have yielded a match. Otherwise, if no such entry is found, the search may be considered to have failed to yield a match.

Song database 180 may include hardware and/or software for storing a plurality of information entries. In some implementations, each entry may include information about a song and/or any other suitable information and/or data. By way of example, the information may include: an identifier for the song (e.g., a title); an identification of an artist who performed the song originally; an identification of an artist who performed a cover version of the song; a list of performances of the song; a date when a particular performance was recorded; and/or any other suitable item of information regarding the song. Song database 180 may be used to retrieve additional information about a song based on an identifier for the song that is provided by one of lyrics database 160 and representation database 170.

Although media player 120, content identification hardware 130, lyrics database 160, representation database 170, and song database 180 are depicted as separate entities, in some implementations any number of them may be integrated together. For example, content identification hardware 130 and media player 120 may be integrated together as a single device. As another example, content identification hardware 130, lyrics database 160, representation database 170, and song database 180 may be integrated together. As yet another example, lyrics database 160, representation database 170, and song database 180 may be integrated together (e.g., such that the information for each song is stored together). In some implementations, any of lyrics database 160, representation database 170, and song database 180 may be implemented as a standalone device (e.g., a server) or as a file, or another type of data structure, that is stored in a memory of content identification hardware 130 and/or media player 120.

Figure 2:
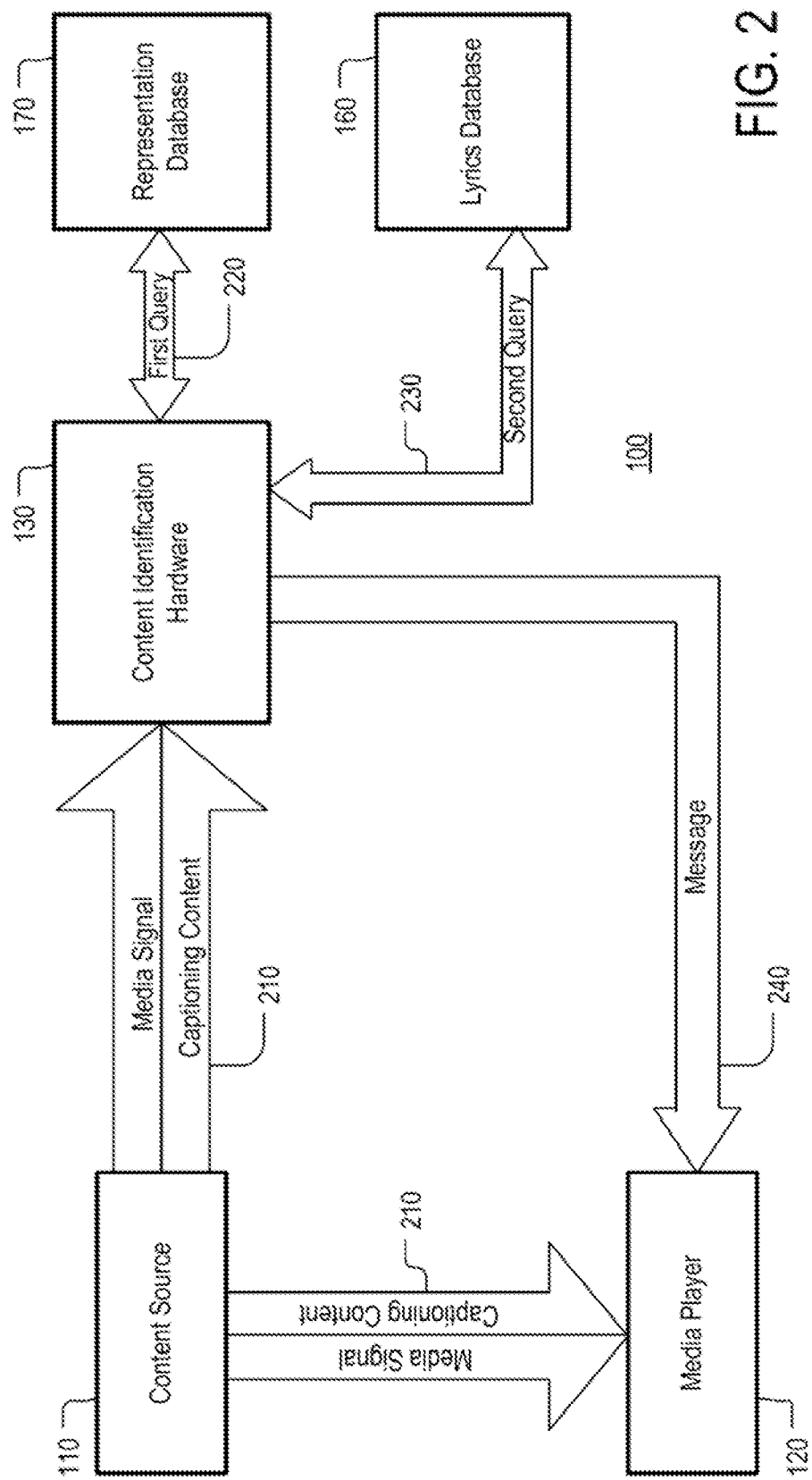
FIG. 2 is an example of a flow of messages in a system for identification of content in accordance with some implementations of the disclosed subject matter.

FIG. 2 depicts an example of a flow of messages in system 100 in accordance with some implementations of the disclosed subject matter. As illustrated, content source 110 may broadcast a media signal 210 to media player 120 and content identification hardware 130. Media signal 210 may be an analog signal, a digital signal, or a combination of the same and it may encode at least one of audio and video of a performance. The performance may be a performance of a song, an acting performance, a theatrical performance, a non-theatrical performance, a musical performance, a speech, a presentation, or any other suitable performance. For example, the performance may include a singer singing a song, a news anchor reading the news, or a television sitcom. In some implementations, the performance may be broadcast live.

In some implementations, media signal 210 may include captioning content. The captioning content may be any type of text that corresponds to words that are spoken or sung over the course of the performance. For example, if the performance is a song, the captioning may include the song's lyrics. In implementations where media signal 210 is a television signal, the captioning content may include teletext data, text formatted according to the EIA-608 standard for close captioning, text formatted according to the CEA-708 standard for close captioning, or any other suitable type of text. In some instances, the captioning content may be provided in video as part of one or more video frames. For example, the captioning content may include subtitles, lyrics (e.g., in cases where content is a karaoke), etc. In such instances, optical character recognition (OCR) may be used to recognize the captioning content. The captioning content may be transmitted as part of media signal 210 or separately from media signal 210 (e.g., in another stream). Any suitable method for formatting and/or transmitting the captioning content may be used. In some implementations, for example, signal 210 may be sent via network 140.

Upon receiving media signal 210, content identification hardware 130 may generate a representation of audio that is encoded in media signal 210. In addition, content identification hardware 130 may also obtain text corresponding to the content associated with media signal 210. For example, in instances where the broadcast performance is a song, a representation may be provided as a fingerprint generated from a segment of the song's audio and text may be extracted from the captioning content that includes a few lines of the lyrics of that song. As another example, in instances where the broadcast performance is a play, a representation may be provided as a fingerprint generated from a segment of the play's audio and text may be obtained from a transcription of some of the play's characters' lines.

Content identification hardware 130 may use the generated representation to produce a first search query 220. In addition, content identification hardware 130 may use the text to produce a second search query 230. Content identification hardware 130 may then perform a first database search by transmitting first search query 220 to representation database 170. In addition, content identification hardware 130 may perform a second database search by transmitting second search query 230 to lyrics database 160. Both search queries may be transmitted over communications network 150, in some implementations.

Content identification hardware 130 may receive responses to the search queries from lyrics database 160 and representation database 170, respectively. Based on the response(s) (or lack thereof), content identification hardware 130 may determine whether the first search and the second search have yielded a match. If the first search has failed to yield a match, while the second query has successfully yielded a match, content identification hardware 130 may transmit a message 240 to media player 120. In some implementations, message 240 may be an indication that the performance that is broadcast via media signal 210 is an unknown performance of known content (e.g., a known song, a known play, or any other suitable type of known content). In some implementations, known content may be any content which content identification hardware 130 is capable of identifying by using at least one of databases 160 and 180. Additionally or alternatively, in some implementations, an unknown performance may be any performance which content identification hardware 130 is not capable of identifying by using at least one of databases 170 and 180. Additionally or alternatively, in some implementations, a known performance may be any performance which content identification hardware 130 is capable of identifying by using one at least one of databases 170 and 180.

In some implementations in which the content broadcast via media signal 210 is a song, message 240 may indicate information related to the song (e.g., the song's title or the song's author). Such information may be retrieved from song database 180, or any other suitable location, by using a song identifier that is returned by lyrics database 160. When the performance is unknown, message 240 may lack information that is performance-specific (e.g., information that is true of one performance, but not of another) because providing any such information for a performance that is unknown may be inaccurate.

Additionally or alternatively, in some implementations, message 240 may include an advertisement for a recording of the same performance and/or another performance of the same content (e.g., the same song). In such implementations, message 240 may indicate whether or not an advertised recording is a recording of the performance that is being broadcast.

Figure 3:
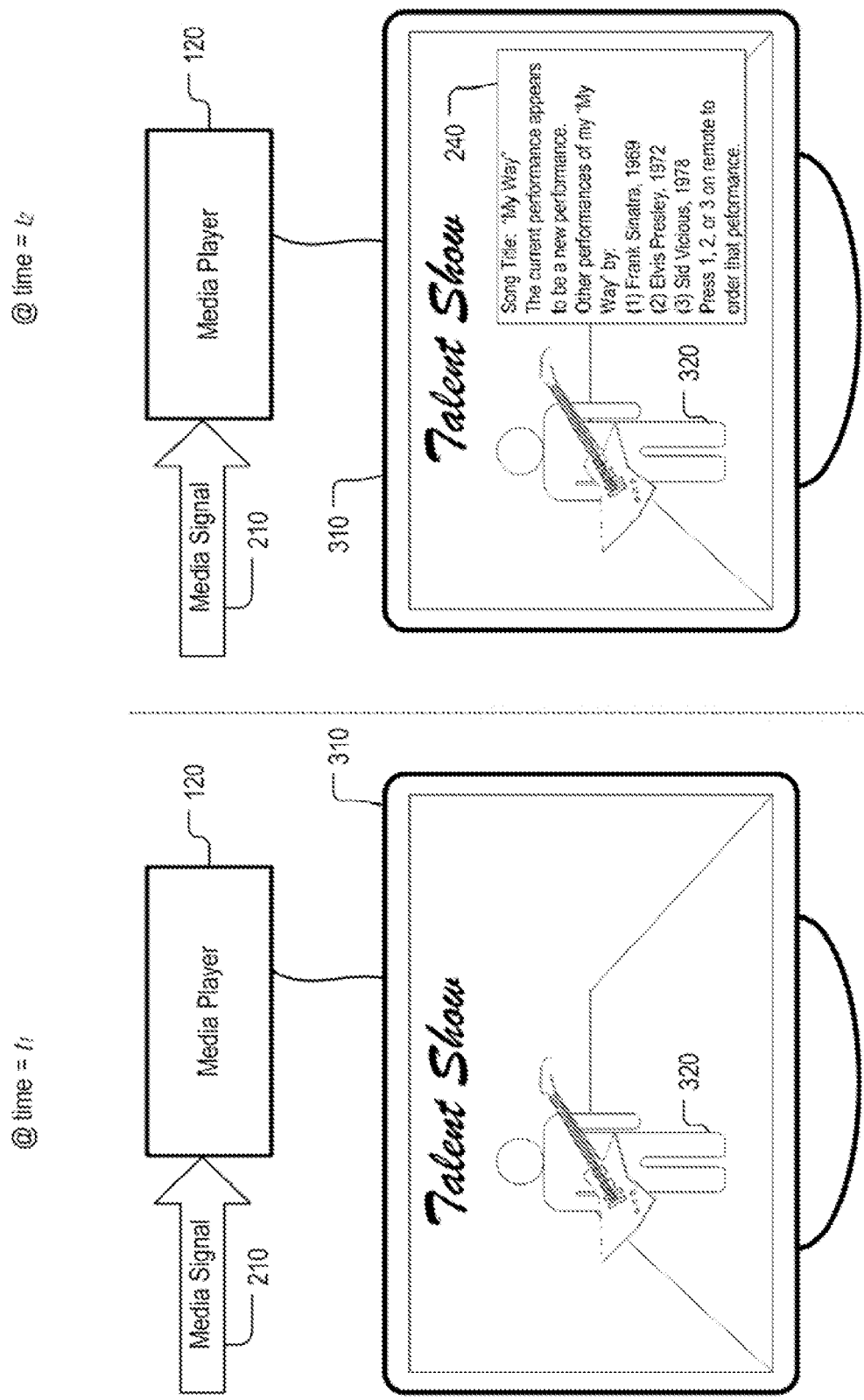
FIG. 3 is an example of the presentation of information and/or an advertisement by a system for identification of content in accordance with some implementations of the disclosed subject matter.

FIG. 3 is an example of the presentation of information and/or an advertisement by system 100 in accordance with some implementations of the disclosed subject matter. In this example, media player 120 may be connected to a television 310. As illustrated, at time $t_1$, media player 120 may receive media signal 210, decode audio and video that is encoded in the signal, and provide the decoded audio and video to television 310. Television 310, in turn, may render the audio and video on a display and/or a speaker. As illustrated, the performance broadcast via media signal 210 may be a performance of a song by an artist 320 that is made as part of a talent competition. Because the performance is a new performance, representation database 170 may lack a representation for that particular performance.

Message 240 may be received by media player 120 at time $t_2$ and subsequently displayed on television set 310. Message 240 may be superimposed, by media player 120, on video that is extracted from media signal 210 and it may include any suitable information related to the performance. For example, message 240 may provide at least one of: the title of the song; an indication that the performance that is being broadcast appears to be a new performance of the song; an indication of one or more other performances of the song; an advertisement for the one or more other performances of the song; and/or any other suitable information.

Message 240 may be selectable by the user (e.g., via a pointing device or a remote control) to enable interaction with the message. For example, selecting message 240 may take the user to an electronic store where he or she can purchase one of the other performances of the content identified in the message. As another example, message 240 may present basic information regarding the content (e.g., a song's title) and selecting message 240 may cause media player 120 to display additional information about the content.

Figure 4A:
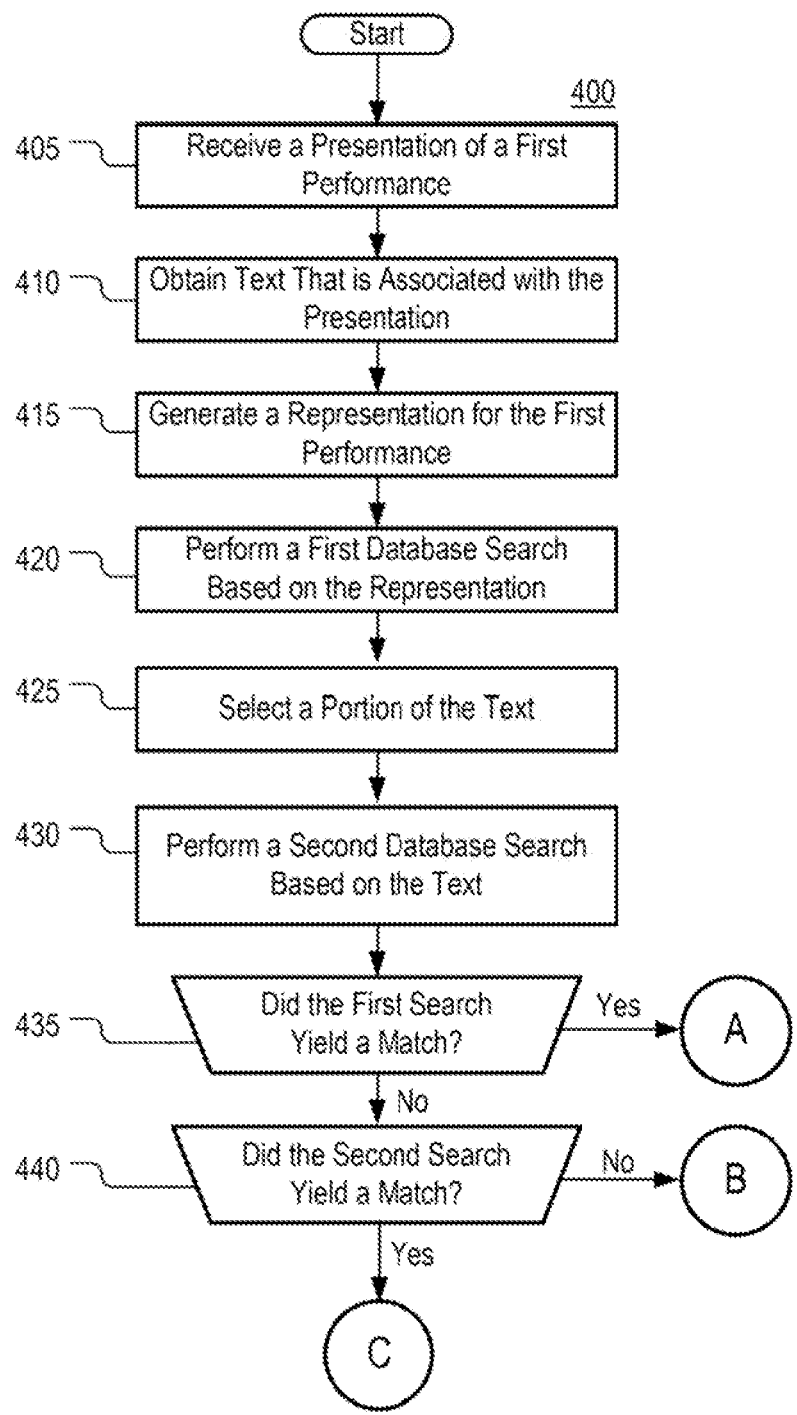
FIGS. 4A and 4B depict a flowchart of an example of a process for identification of content in accordance with some implementations of the disclosed subject matter.
Figure 4B:
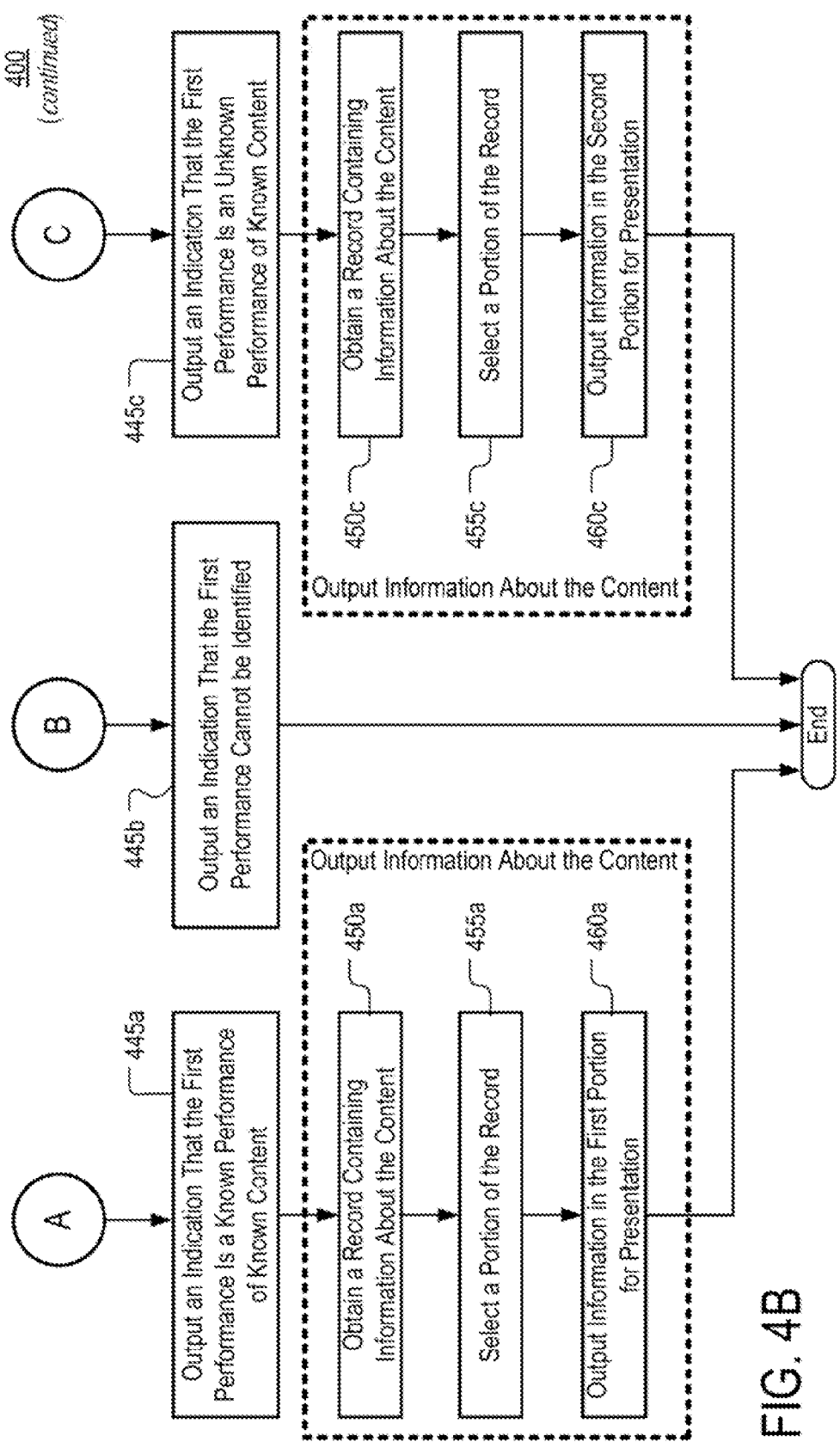

FIGS. 4A and 4B depict a flowchart of an example of a process 400 for content identification in accordance with some implementations of the disclosed subject matter. At 405, a presentation of a first performance is received. The first performance, as noted above, may be a performance of any type of content, such as a song performance, a play performance, or any other suitable type of performance. The presentation may be received in any suitable manner, such as via a cable television broadcast, an over-the-air television broadcast, an Internet stream, a download, receipt from a storage device, video-on-demand, or any other suitable type of broadcast. For example, the presentation may be received as a cable television broadcast and the first performance may be a song performance.

At 410, text associated with the presentation is received. The text may include one or more words that are sung or spoken as part of the first performance. In some implementations, the text may be received as part of captioning content that is associated with the presentation. Additionally or alternatively, the text may be obtained by using speech-to-text translation on audio that is provided with the presentation. Additionally or alternatively, the text may be obtained by using optical character recognition (OCR) to recognize subtitles that are provided as part of video that is provided by the signal. Any suitable method may be used to obtain the text in some implementations.

At 415, a representation of audio that is part of the presentation is obtained. For example, in some implementations, a fingerprint for the audio may be generated. For example, a fingerprint may be based on a segment of the presentation (e.g., the first 10 seconds). Information on the generation of fingerprints is provided in A. Wang, "*An Industrial Strength Audio Search Algorithm*," In Proceedings of the International Conference on Music Information Retrieval, 2003, which is hereby incorporated by reference herein in its entirety.

At 420, a first search of a first database (e.g., representation database 170) is performed based on the generated representation. Performing the first search, in some implementations, may include providing the first database with a first search query that is based on the generated representation and receiving a response. For example, in some implantations, the first database may be representation database 170. In instances where the first database includes a representation for a song that matches the generated representation (i.e., in instances where the first search yields a match), the first database may return an identifier for the song. Otherwise, the first database may return an indication that the search failed to yield a match.

At 425, at least a portion of the text received at step 410 is selected. The text portion may include any suitable number of words. At 430, a second search of a second database (e.g., lyrics database 160) is performed. Performing the second search, in some implementations, may include providing the second database with a second search query that is based on the selected text and receiving a response. In instances where the second database includes text that matches the selected text block (i.e., in instances where the second search yields a match), the second database may return an identifier for the song. Otherwise, the second database may return an indication that the search failed to yield a match.

At 435, a determination is made whether the first search yielded a match. Upon a positive determination, the execution of process 400 proceeds to step 445a. Otherwise, if it is determined that the first search did not yield a match, the execution of process 400 proceeds to step 440.

At 440, a determination is made whether the second search yielded a match. Upon a positive determination, the execution of process 400 proceeds to step 445b. Otherwise, if it is determined that the second search did not yield a match, the execution of process 400 proceeds to step 445c.

At 445a, an indication that the first performance is a known performance of known content is output for presentation. The indication may include text, video, audio, executable code, or any other suitable type of information. In some implementations, the indication that the first performance is a known performance of known content may include an advertisement inviting a user to purchase a recording of the first performance and/or another performance of the same content.

At 450a, a record associated with the content is obtained. The record may be identified based on an identifier that is returned as a result of the first database search. In implementations where the content is a song, the record may be obtained from a third database, such as song database 180, and it may include information found in at least one entry of the database.

At 455a, information in a first portion of the record is selected. The information in the first portion may include all information from the record or a subset of this information. The information in the first portion may include information that is performance-specific. As noted above, information that is performance-specific with respect to the first performance may be capable of being used to distinguish the first performance from another performance of the same content (e.g., a song). By way of example, such performance-specific information may include: a time of the first performance; a venue of the first performance; an identifier for an artist who delivered the first performance; a studio where the performance was recorded; and/or an identifier for a sound engineer/crew that recorded the performance; or any other suitable type of information.

At 460a, information in the first portion of the record is output for presentation. Although outputting the indication that the first performance is a known performance of known content and outputting information in the first portion of the information record are discussed as being distinct steps in this example, in some implementations they may be part of the same step. In some implementations, the indication that the first performance is a known performance may be included in the first portion of the information record.

At 445b, an indication is output that the first performance cannot be identified. As noted, in some implementations, step 445b may be executed when both the first database search and the second database search fail to yield a match.

At 445c, an indication that the first performance is an unknown performance of known content is output for presentation. The indication may include text, audio, video, executable code, or any suitable type of information. In some implementations, the indication may include an advertisement inviting a user to purchase a recording of the first performance and/or another performance of the same content.

At 450c, a record associated with the content is identified. The record may be identified based on an identifier that is returned as a result of the first database search and/or the second database search. The record may be obtained from a third database, such as song database 180, and/or from any suitable source.

At 455c, information in a second portion of the record is selected. In some implementations, information in the second portion may include performance-agnostic information and it may lack information that is performance-specific. In contrast to performance-specific information, which is discussed with respect to step 455a, performance-agnostic information may include any information that does not distinguish the first performance from another performance of the same song. In some implementations, performance-agnostic information may include information that may be true of multiple performances of content (e.g., a song). Examples of performance-agnostic information may include name of the known content or name of the author of the content.

At 460c, information in the second portion is output for presentation. Although in this example outputting the indication that the first performance is an unknown performance of known content and outputting information in the second portion of the information record are discussed as being distinct steps, in some implementations they may be part of the same step. In some implementations, the indication that the first performance is an unknown performance of known content may be included in the second portion of the information record.

Process 400 may be executed by content identification hardware 130, media player 120, or any other suitable device. More particularly, any of the tasks of process 400 may be executed, at least in part, by one or more hardware processors that are part of the device executing the process. By way of example, outputting information for presentation to a user, as discussed with respect to steps 445a-c, 460a, and 460c, may include transmitting the information over a communications network to a client device (e.g., media player 120), displaying the information on a display, or outputting the information in sound on a speaker. Any suitable method for outputting information may be used. In some implementations, the method for outputting information may depend on whether process 400 is executed on a client device that is watched/listened by a user (e.g., a media player or a television set) or by an intermediate device (e.g., content identification hardware 130) that is coupled to the client device over a communications network or another type of connection.

Figure 5:
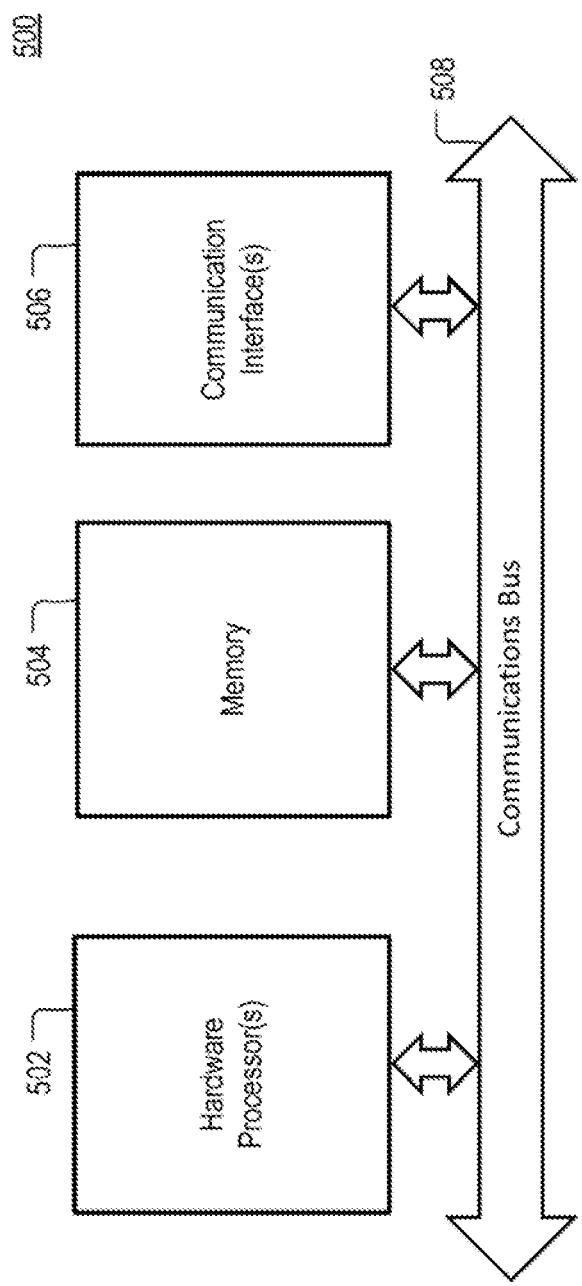
FIG. 5 is a block diagram of an example of hardware for identification of content in accordance with some implementations of the disclosed subject matter.

FIG. 5 depicts an example of hardware 500 that can be used to implement any of media player 120, content identification hardware 130, lyrics database 160, representation database 170, and song database 180 in accordance with some implementations of the disclosed subject matter. As illustrated in FIG. 5, hardware 500 can include one or more hardware processors 502, memory 504, communication interface(s) 506, and communications bus 508. Hardware processor(s) 502 can be any suitable hardware processor(s), such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or a supercomputer, in some implementations. Memory 504 may be any volatile or non-volatile memory (e.g., RAM, a solid state drive (SSD), a hard disk, etc.). Communications interface(s) 506 can include one or more communications network adapters and it can enable the hardware and/or software to communicate with other communications networks (e.g., such as the Internet, wired networks, wireless networks, etc.), other equipment, and/or any other suitable networks, devices, etc. Communications bus 508 may include a front side bus (FSB), a computer expansion bus, or any other suitable bus for connecting to electronic components (e.g., computer components) to hardware processor(s) 502.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that FIGS. 1-5 are provided as examples only. In some implementations, one or more of the steps of process 400 may be performed in a different order than represented, performed concurrently, or omitted. Furthermore, it should be noted that the disclosed subject matter is not limited to identifying song performances. For example, in some instances, process 400 may be used to identify performances of plays or speeches that are broadcast on television. In such instances, instead of a lyrics database, a database that contains the scripts/text of plays or speeches may be used to identify the performance. Similarly, a database that includes records about the plays may be used in place of the song database. In other words, any suitable type of performance may be identified using process 400. Furthermore, the indications that a given performance is a known/unknown performance of a known song/speech/play may be provided to a system for collection of royalties. In that regard, the disclosed subject matter may be used in any context where it may be desirable to monitor content presentations.

The provision of the examples described herein (as well as clauses phrased as "such as," "e.g.", "including" and the like) should not be interpreted as limiting the claimed subject matter to the specific examples; rather, the examples are intended to illustrate only some of many possible aspects.

Although the invention has been described and illustrated in the foregoing illustrative implementations, it is understood that the present disclosed subject matter has been made only by way of example, and that numerous changes in the details of implementation of the invention can be made without departing from the spirit and scope of the invention, which is limited only by the claims which follow. Features of the disclosed implementations can be combined and rearranged in various ways.

What is claimed is:

1. A system for identifying content, comprising at least one hardware processor that:
 receives content having audio;
 generates a representation of the audio of the content;
 performs a first database search based on the representation;
 performs a second database search based on text corresponding to words that are sung or spoken in the content;
 responsive to determining that the first database search yielded a match and the second database search yielded a match, causes a first indication that the content contains a known performance of first known content to be output for presentation to a user, wherein the first indication includes identifying information of the known performance of the first known content; and
 responsive to determining that the first database search yielded no match and the second database search yielded a match, causes a second indication that the content contains a cover performance of second known content to be output for presentation to the user, wherein the second indication includes identifying information of the second known content and identifying information of a known performance of the second known content.

2. The system of claim 1, wherein the representation is a fingerprint.

3. The system of claim 1, wherein the text is based on close captioning data that is associated with the content.

4. The system of claim 1, wherein the text is based on optical character recognition performed on video that is part of the content.

5. The system of claim 1, wherein the text is based on speech recognition performed on the audio.

6. The system of claim 1, wherein causing the second indication to be output includes at least one of:
 transmitting the second indication over a communications network to a client device, and
 displaying the second indication on a display screen.

7. The system of claim 1, wherein causing the second indication to be output includes superimposing the second indication on video that is part of the content.

8. The system of claim 1, wherein the second indication includes an advertisement for a recording of the known performance of the second known content.

9. A method for identifying content, comprising
 receiving content having audio;
 generating a representation of the audio of the content;
 performing a first database search based on the representation;
 performing a second database search based on text corresponding to words that are sung or spoken in the content;
 responsive to determining that the first database search yielded a match and the second database search yielded a match, causing, by at least one hardware processor, a first indication that the content contains a known performance of first known content to be output for presentation to a user, wherein the first indication includes identifying information of the known performance of the first known content; and
 responsive to determining that the first database search yielded no match and the second database search yielded a match, causing, by the at least one hardware processor, a second indication that the content contains a cover performance of second known content to be output for presentation to the user, wherein the second indication includes identifying information of the second known content and identifying information of a known performance of the second known content.

10. The method of claim 9, wherein the representation is a fingerprint.

11. The method of claim 9, wherein the text is based on close captioning data that is associated with the content.

12. The method of claim 9, wherein the text is based on optical character recognition performed on video that is part of the content.

13. The method of claim 9, wherein the text is based on speech recognition performed on the audio.

14. The method of claim 9, wherein causing the second indication to be output includes at least one of:
- transmitting the second indication over a communications network to a client device, and
- displaying the second indication on a display screen.

15. The method of claim 9, wherein causing the second indication to be output includes superimposing the second indication on video that is part of the content.

16. The method of claim 9, wherein the second indication includes an advertisement for a recording of the known performance of the second known content.

17. A non-transitory computer-readable medium containing computer-executable instructions that, when executed by a processor, cause the processor to perform a method for identifying content, the method comprising:
- receiving content having audio;
- generating a representation of the audio of the content;
- performing a first database search based on the representation;
- performing a second database search based on text corresponding to words that are sung or spoken in the content;
- responsive to determining that the first database search yielded a match and the second database search yielded a match, causing a first indication that the content contains a known performance of first known content to be output for presentation to a user, wherein the first indication includes identifying information of the known performance of the first known content; and
- responsive to determining that the first database search yielded no a match and the second database search yielded a match, causing a second indication that the content contains a cover performance of second known content to be output for presentation to the user, wherein the second indication includes identifying information of the second known content and identifying information of a known performance of the second known content.

18. The non-transitory computer-readable medium of claim 17, wherein the representation is a fingerprint.

19. The non-transitory computer-readable medium of claim 17, wherein the text is based on close captioning data that is associated with the content.

20. The non-transitory computer-readable medium of claim 17, wherein the text is based on optical character recognition performed on video that is part of the content.

21. The non-transitory computer-readable medium of claim 17, wherein the text is based on speech recognition performed on the audio.

22. The non-transitory computer-readable medium of claim 17, wherein causing the second indication to be output includes at least one of:
- transmitting the second indication over a communications network to a client device, and
- displaying the second indication on a display screen.

23. The non-transitory computer-readable medium of claim 17, wherein causing the second indication to be output includes superimposing the second indication on video that is part of the content.

24. The non-transitory computer-readable medium of claim 17, wherein the second indication includes an advertisement for a recording of the known performance of the second known content.

* * * * *